(12) United States Patent
Carter (10) Patent No.: US 6,498,031 B1
(45) Date of Patent: Dec. 24, 2002

(54) COLUMN REACTOR FOR TESTING AND EVALUATING REFRACTORY ORES

(75) Inventor: Andrew J. Carter, Plano, TX (US)

(73) Assignee: Oxidor Corporation, Inc., Plano, TX (US)

( * ) Notice: Subject to any disclaimer, the term of this patent is extended or adjusted under 35 U.S.C. 154(b) by 0 days.

(21) Appl. No.: 09/578,868

(22) Filed: May 26, 2000

Related U.S. Application Data (60) Provisional application No. 60/136,775, filed on May 28, 1999.

(51) Int. Cl.[7] .................................................. C12M 1/04
(52) U.S. Cl. ............................... 435/287.1; 435/289.1; 435/294.1; 435/299.1
(58) Field of Search ............................. 435/262, 262.5, 435/264, 850, 289.1, 294.1, 299.1, 287.1; 423/27, 150, DIG. 17; 75/712, 743, 744, 772

(56) References Cited

U.S. PATENT DOCUMENTS

| | | | |
|---|---|---|---|
| 2,829,964 A | * 4/1958 | Zimmerley et al. | 210/620 |
| 4,376,826 A | * 3/1983 | Mynatt | 435/252.1 |
| 4,571,387 A | 2/1986 | Bruynesteyn et al. | |
| 4,987,101 A | 1/1991 | Hackl et al. | |
| 5,006,320 A | 4/1991 | Reid et al. | |
| 5,127,942 A | * 7/1992 | Brierley et al. | 423/22 |
| 5,244,493 A | 9/1993 | Brierley et al. | |
| 5,246,486 A | 9/1993 | Brierley et al. | |
| 5,332,559 A | 7/1994 | Brierley et al. | |
| 5,354,359 A | 10/1994 | Wan et al. | |
| 5,431,717 A | 7/1995 | Kohr | |
| 5,573,575 A | 11/1996 | Kohr | |
| 5,827,701 A | * 10/1998 | Lueking et al. | 435/168 |
| 6,063,158 A | * 5/2000 | Sharp et al. | 423/DIG. 17 |
| 6,228,267 B1 | * 5/2001 | Yamasaki et al. | 210/151 |

FOREIGN PATENT DOCUMENTS

CA        2155050        2/1996

* cited by examiner

Primary Examiner—William H. Beisner
(74) Attorney, Agent, or Firm—J. Clay Matthews; Patton Boggs, LLP (57) ABSTRACT

The present invention is directed to microbiological processes for the oxidative treatment of refractory gold and base metal ores and concentrates, and particularly, an apparatus for testing refractory gold and sulfidic base metal ores for their suitability to heap biooxidation or bioleaching processes. The invention can be used to simulate heap biooxidation. This apparatus incorporates features of heap biooxidation and may be used to generate engineering data for creating detailed process and engineering designs. The invention can be used to develop a select population of bacteria geared to optimize biooxidation of a specific refractory ore.

23 Claims, 3 Drawing Sheets

COLUMN REACTOR FOR TESTING AND EVALUATING REFRACTORY ORES

BACKGROUND OF THE INVENTION

This application claims the benefit of U.S. provisional application Ser. No. 60/136,775, which was filed on May 28, 1999.

FIELD OF THE INVENTION

The present invention relates to microbiological processes for the oxidative pretreatment of refractory gold and base metal ores and concentrates, and more particularly, to an apparatus for testing the suitability of such ores for heap biooxidation treatment.

DESCRIPTION OF THE BACKGROUND

Precious metals are found throughout the world as ores within the Earth's crust, on the crust surface and dispersed in bodies of water. The precious metal is nearly always in an unrefined state intimately associated with other minerals such as sulfur in the form of arsenopyrite or pyrite. To extract the metal, ore must be processed to remove contaminating minerals such as sulfur, carbon and iron. A commonly used processing technique is cyanidation which involves, quite simply, leaching the ore with cyanide. The cyanide leaches the ore, releasing the precious metal from its association with the gangue minerals. Precious metal is leached into a liquid phase from which it can be recovered.

Gold ores are categorized into two types—free milling and refractory—depending on their refractoriness to cyanidation treatment. Free milling ores generally have a low sulfur content and are most often processed by simple gravity techniques or direct cyanidation. Refractory ores, having a higher sulfur content, are difficult to process due to a high content of metallic sulfides, such as pyrite, arsenopyrite and other matter, and require more complex extraction methods. One of the most common of such measures is oxidation.

Oxidation of refractory ores involves a pretreatment step in which the ore is subjected to a roasting or pressure-oxidation technique, typically in conjunction with a preconcentration process. Increasingly, biooxidation is being used as the pretreatment of choice in substitution for these other more traditional oxidation processes. In biooxidation, the metal sulfides in ore are oxidized in a microbial pretreatment step, prior to the cyanidation step. Specifically, the bacteria oxidize both iron and sulfur under acidic conditions. Oxidation of iron sulfide particles causes the solubilization of iron as ferric ion and sulfide as sulfate ion. This liberates the encapsulated precious metal and makes it amenable to a leaching agent, such as cyanide. The precious metal is subsequently recovered from the oxidized materials by cyanidation, carbon-in-leach or thiosulfate leaching processes.

The adaptation of bacteria in the biooxidation process to recover precious metals from refractory ores has been previously described in a number of variations. For example, one method involves oxidizing multi metallic sulfide ores using a combination of chemical/biological leaching processes and at least three different types of bacteria (U.S. Pat. No. 4,987,081). Bacterial cultures of *Thiobacillus thiooxidans, Thiobacillus ferrooxidans* and *Leptospirillum ferrooxidans* are first adapted to high dissolved arsenic concentrations and low pH by subjecting the cultures in a solution containing dissolved arsenic to successive incremental concentrations of arsenic while operating in a continuous mode.

Another process involves the biological oxidation of sulfide in sulfide-containing gold ore followed by cyanide leaching (U.S. Pat. No. 5,006,320). This method involves a further processing step for aerating microorganisms during the oxidation step followed by a subsequent extraction of the metal value from the biooxidized ore.

Biooxidation is not limited to the treatment of gold ores. A related method for producing nickel from sulfide ore involves oxidation by heap leaching (Canadian Patent No. 2,155,050). According to this method, nickel ore, which contains a substantial amount of iron, is subjected to a biological oxidation step and separated from iron into an eluate solution. Nickel is removed from the solution by solvent extraction or by use of an ion exchange resin and subsequent electrowinning of the ferronickel.

Metals can also be recovered from refractory sulfide ores by first separating the crushed ore into a fines and a coarse fraction (U.S. Pat. No. 5,573,575). A heap is formed from the coarse fraction and a concentrate is produced from the fines. The concentrate is then added to the heap for biooxidation. Alternatively, biooxidation of sulfides in the mineral ores may be done by forming particulates. A heap of particulates is formed and a leaching solution is circulated within the heap (U.S. Pat. No. 5,246,486). A variation on this technique involves polymer agglomeration to aid in the removal of particulates from the metal ore (U.S. Pat. No. 5,332,559).

Metals can also be recovered from a refractory sulfide ore by first separating the clays and fines from the crushed ore, and forming a heap from the crushed refractory ore (U.S. Pat. No. 5,431,717). If there is a sufficient amount of precious metal in the separated clays and fines, these materials are further processed. Methods for the biooxidation of refractory carbonaceous or carbonaceous-sulfidic ore material using a specific carbon-deactivating microbial consortium have also been used with varying degrees of success (U.S. Pat. No. 5,244,493).

Preg-robbing by carbon and carbon-containing compounds is also a major problem interfering with efficient recovering of metals from refractory ores. One process to overcome this problem uses leaching with a thiosulfate lixiviant to selectively remove the metal (U.S. Pat. No. 5,354,359). This process involves contacting particulates containing precious metal and preg-robbing carbonaceous components with a thiosulfate lixiviant solution forming stable precious metal thiosulfate complexes. The lixiviant solution is recovered after it has had time to become loaded with the metal in the ore material.

Leaching has also been used to remove copper from copper sulfide-containing ore (U.S. Pat. No. 4,571,387). According to this process, ore is ground and mixed with an aqueous acid-leaching medium containing sulfide-oxidizing bacteria, a bacterial nutrient and a catalytic amount of silver. Carbon dioxide and oxygen are provided as well as a bacterial compatible acid. The basic leaching process has been enhanced to increase the leaching rate of a mineral when the mineral is characterized by the tendency to form a reaction product layer during leaching (U.S. Pat. No. 4,343,773). A particulate modifier such as carbon is mixed with the mineral before leaching and selectively alters the characteristics of the reaction product layer.

Prior to incurring the substantial costs inherent in scaling up to biooxidize a particular ore, the ore under consideration typically is batch tested to determine if it is suitable for biooxidation. However, conventional testing procedures can take as long as six months to complete due to the time needed for adaptation of the bacteria and the lag phase between inoculation and the onset of oxidation.

SUMMARY OF THE INVENTION

The present invention overcomes the problems and disadvantages associated with current strategies and designs and provides a novel column reactor for use in the processing of refractory ores.

One embodiment of the invention is directed to a novel column reactor which simulates continuous operating conditions of heap biooxidation and other types of static reactors. The novel reactor of the present invention can be used to facilitate the testing of refractory gold and base metal sulfide ores for their suitability to heap biooxidation or bio-leaching. Such base metal sulfide ores include base and precious metals. The reactor contains features of heap biooxidation processes such as integral inoculum generation, and can be used to generate process engineering and design data for such processes. The reactor of the present invention incorporates novel means for the simultaneous aeration of the charge, collection of solution samples and regeneration of bacteria and overcomes one of the fundamental problems of biooxidation systems, namely, that of instability.

The present invention incorporates a novel inoculum regeneration system comprising both an air-sparged reactor and electrocell. This combination of reactors overcomes the oxygen mass transfer limitations of the electrocell such that the only limitation becomes cell size.

Accordingly, one embodiment of the invention is directed to a biooxidation apparatus for simulating heap biooxidation comprising: a combination plenum chamber/bacterial regenerator coupled to the oxidation chamber, the regenerator comprising means for providing oxygen to a population of bacteria being regenerated and means for providing a ferrous iron substrate to the population of bacteria; means for recirculating the population of bacteria from the bacterial regenerator through the electrocell; and means for aerating the plenum chamber.

Still another embodiment is directed to a biooxidation apparatus for evaluating the suitability of a refractory ore to heap biooxidation. Another embodiment of the invention is directed to an apparatus for generating a selected population of bacteria useful for the biooxidation of a specific refractory ore.

Still another embodiment is directed to a method for generating a selected population of bacteria useful for the biooxidation of a specific refractory ore. Another embodiment is directed to a novel method for evaluating the suitability of a refractory ore for biooxidation. Still other embodiments of the invention are directed to novel methods and apparatuses for providing a continuous supply of ferrous iron and oxygen to biooxidative bacteria to enhance growth, and to methods and apparatuses for recycling effluent from the biooxidation of refractory ores.

Other embodiments and advantages of the invention are set forth, in part, in the description which follows, and, in part, will be obvious from this description and may be learned from the practice of the invention.

DESCRIPTION OF THE INVENTION

As embodied and broadly described herein, the present invention is directed to novel apparatus that simulate biooxidation conditions in the processing of refractory ores, novel methods for utilizing the apparatus and novel methods for developing biooxidative bacteria targeted to a specific refractory ore.

In conventional processing of refractory ores, it is difficult and often impossible to determine which processing steps will ensure maximum recovery of the metal values. Whether a particular refractory ore will be more suitable for heap biooxidation or simply bio-leaching cannot be ascertained from a visual inspection. Further, even when the choice is made to proceed with a particular process, the success of that process is not assured as there are presently a number of unknown variables.

It has been discovered that a number of previously unknown variables can be accurately and quantitatively assessed, and assessed before processing has begun, to enable the maximum recovery of a precious metal from an ore. In many cases, this pre-assessment allows for a substantial increase, both qualitatively and quantitatively, in the base metal recovered. Further, these predeterminations lead to process engineering and design improvements in the general process. These improvements facilitate the testing of refractory ores containing gold and other base metals for their suitability to heap biooxidation or bio-leaching.

One embodiment of the invention is directed to a device for simulating the conditions of biooxidation. The basic device mimics conditions which exist in the ore heap during oxidation. By controlling the environmental conditions such as, for example, temperature, nutrient content, aeration and other parameters, the oxidation process can be controlled and closely monitored. In this way, different processes can be tested and the results achieved on the same ore compared for effectiveness and efficiency. As conditions can be controlled, and the process conducted on a sample as opposed to the entire heap, the entire procedure can be completed in a very short time frame. The most effective procedure, in other words, the procedure that produces the highest quality and quantity of valuable metal after processing, can be quickly determined and, thereafter, that process can be applied to the ore heap. Further, the device can be made to a size that is suitable for the intended use. For example, one or more small devices can be constructed that are easily portable to a mining sites or other areas where it is desirable to simulate biooxidation conditions. Such devices can be made inexpensively and with materials designed for single use (i.e., disposable) or multiple use. Alternatively, one or more large-scale devices can be constructed in warehouses for repeated operations at a central location where ore samples are shipped for testing and evaluation.

The apparatus itself comprises a column in which the ore to be tested is placed. The column may incorporate features for the simultaneous aeration of the sample or charge, collection of solution samples and regeneration of bacteria. As such, the device overcomes one of the fundamental problems of biooxidation systems, namely, that of instability. Further, the device may incorporate a novel inoculum regeneration system comprising both a conventional air-sparged reactor and electrocell. This novel combination of components overcomes the oxygen mass transfer limitations of the electrocell such that the only limitation becomes cell size.

Precious metals, such as gold, in refractory ores often occur as a colloidally-dispersed phase within an arsenopyrite matrix or as micron-sized particles along the grain boundaries and interstices within pyrite. To make this metal accessible for extraction, the sulfide matrix must be broken down by, for example, an oxidation process such as biooxidation. As noted, biooxidation is a process in which the metal sulfides in refractory ores are oxidized using bacteria in a microbial pretreatment step, performed prior to leaching. Oxidizing bacteria oxidize both iron- and sulfur-containing compounds under acidic conditions. Oxidization of the iron-sulfide particles causes the solubilization of iron as ferric iron and sulfide as sulfate ion. This liberates the encapsulated precious metal and makes it amenable to a leaching agent, such as cyanide.

Bacteria used in biooxidation processes are generally referred to as aerobic, acidophilic, thermophilic chemoautolithotrophs. These microorganisms prefer warm, acid and aerobic conditions in which to thrive and grow by metabolizing mineral substrates. The types commonly employed in biooxidation fall into two broad categories, mesophiles and moderate thermophiles. Mesophilic cultures usually comprise a mixed consortium of, for example, *Thiobacillus ferrooxidans, Thiobacillus thiooxidans* and *Leptospirillum ferroxidans*. Moderate thermophiles usually comprise, for example, *Sulfobacillus thermosulfidooxidans, Metallosphera sedula* and bacteria of the sulfolobus type.

Chemical reactions illustrative of biooxidation systems include:

A. Direct bacterial attack of pyrite and arsenopyrite:

$$4FeS_2 + 15O_2 + 2H_2O \rightarrow 2Fe_2(SO_4)_3 + 2H_2SO_4$$

$$2FeAsS + 7O_3 + H_2SO_4 + 2H_2O \rightarrow 2H_3AsO_4 + Fe_2(SO_4)_3$$

B. Indirect chemical attack of pyrrhotite and arsenopyrite:

$$4Fe_7S_8 + 69O_2 + 10H_2SO_4 \rightarrow 14Fe_2(SO_4)_3 + 10H_2O$$

$$Fe_7S_8 + 7Fe_2(SO_4)_3 \rightarrow 21FeSO_4 + 8S^0$$

$$4FeAsS + 5O_2 + 4H_2SO_4 \rightarrow 4HAsO_2 + 4FeSO_4 + 4S^0 + 2H_2O$$

C. Bacterial re-oxidation of sulfur and ferrous sulfate:

$$2S^0 + 3O_2 + 2H_2O \rightarrow 2H_2SO_4$$

$$4FeSO_4 + 2H_2SO_4 + O_2 \rightarrow 2Fe_2(SO_4)_3 + 2H_2O$$

Figure 1:
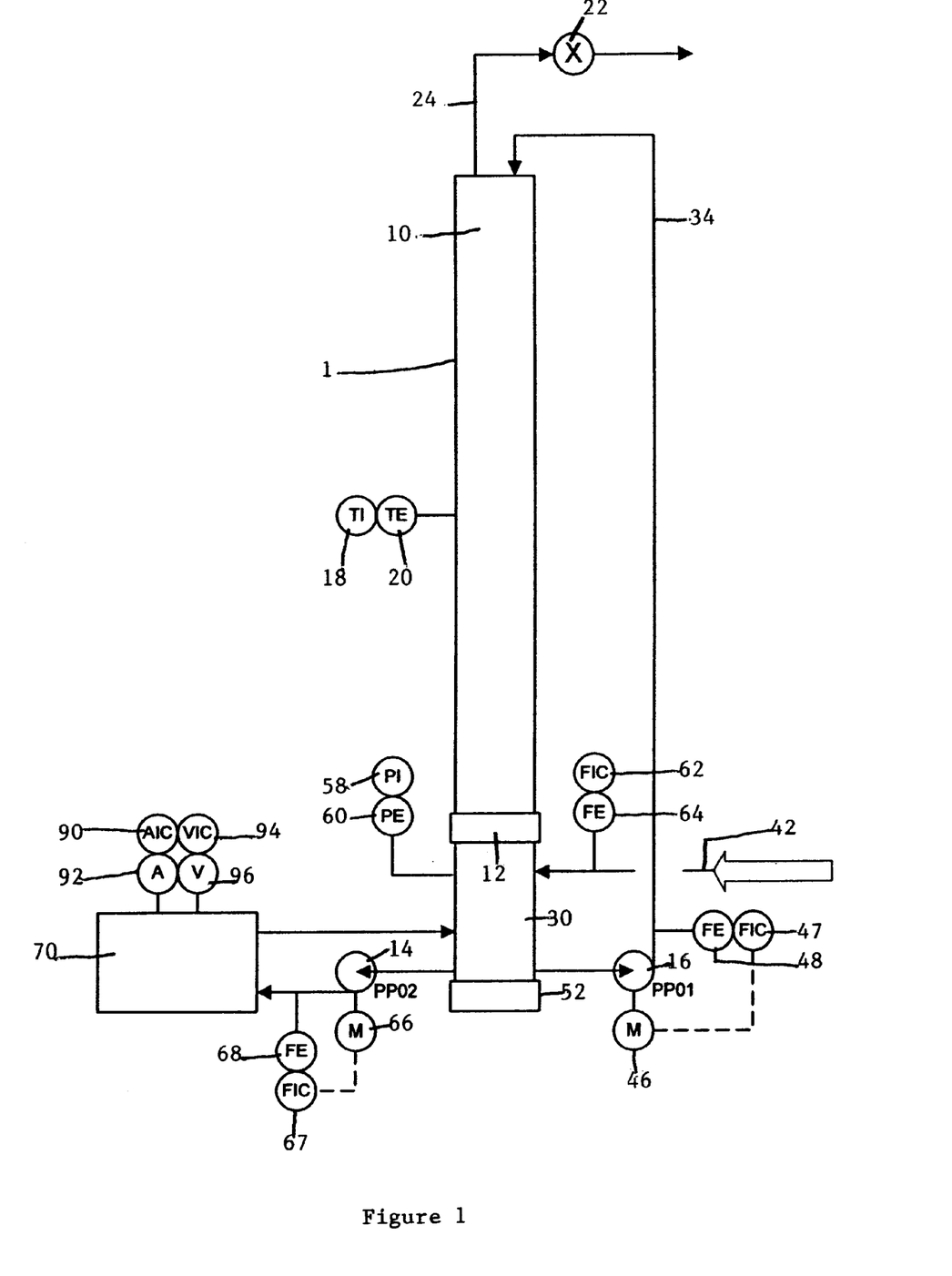
FIG. 1 Schematic drawing of a reactor apparatus.
Figure 2:
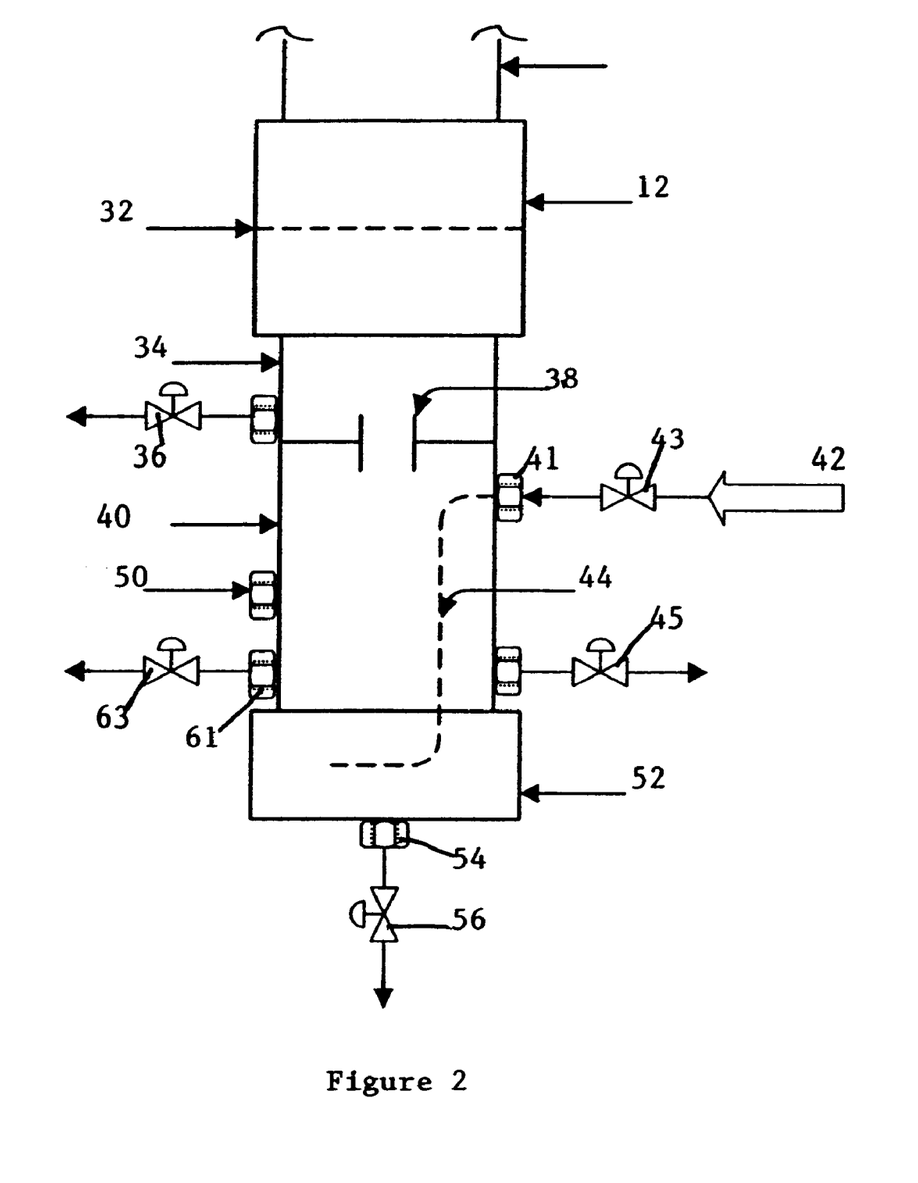
FIG. 2 Schematic drawing of a plenum chamber of the reactor apparatus.
Figure 3:
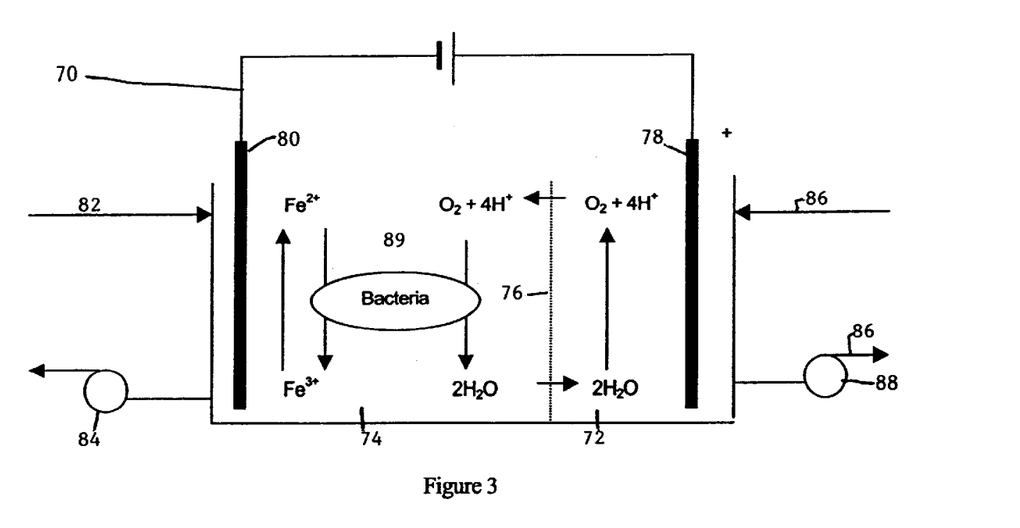
FIG. 3 Schematic drawing of an electrocell of the reactor apparatus.

One embodiment of the apparatus, including its component parts, is depicted in FIGS. 1–3. However, it is clear to those of ordinary skill in the art that the size (e.g., 10–100 cm.; 50–500 cm.; 100–10,000 cm.; 1–100 m.) as well as the structure (e.g., chamber vs. column; round vs. square column) of the apparatus can be significantly varied as desired and appropriate for the user.

Referring to FIGS. 1–3, reactor apparatus 1 comprises three main elements, column 10 for the oxidation of the ore, plenum chamber 30 to support the charge, pressurize column 10 to collect and hold solutions and regenerate bacterial inoculum, and electrocell 70 to augment the production of inoculum. Column 10 is simply a chamber and, as shown, preferably comprises a 2 m×150 mm PVC or acrylic column. The plenum chamber is a container which may be constructed of an appropriately durable material such as, for example, polyvinyl chloride (PVC). Electrocell 70 is a standard commercially available unit.

Column 10 is coupled to plenum chamber 30 via coupling 12. Reactor apparatus 1 is equipped with pumps 14 and 16 for the movement of solutions. Specifically, pump 14 pumps inoculum solution from plenum chamber 30 to electrocell 70. Pump 16 recirculates regenerated inoculum from plenum chamber 30 to column 10. Reactor apparatus 1 may also include instruments for controlling the electrocell and measuring the amount of fluids, including liquids and gasses, that flow through the plenum chamber. For example, temperature indicator 18 and thermocouple 20 are used to monitor the temperature of the interior of column 10. Preferably, the column is also equipped with gas analyzer 22 for the analysis of the off-gas stream 24.

Ore material is generally rock which may be in the form of large boulders, smaller rocks or pebbles, or very small particles. If necessary, the ore to be tested may be reduced is size using crushers and/or grinders, both of which are well-known and commercially available devices. Preferably, the ore is crushed to an 80% minus 9.5 mm passing size. An approximately 60 kg charge of ore is then loaded into column 10. Sulfuric acid is circulated through column 10 to lower the pH of the charge to 1.5 to 1.8. Acid is subsequently removed and replaced with an appropriate volume of active bacterial inoculum and nutrient material such as, for example, nitrogen, phosphorus and potassium, etc. Air 42 is then applied to the column to provide a continuous supply of oxygen and carbon dioxide. The inoculum is then circulated at a rate appropriate for oxidizing the particular ore being tested. The cycle time and rate are dependent on the sulfide content of the ore and the overall level of oxidation required. For the preferred embodiment, the rate sufficient to oxidize the ore is about $0.0037\ m^3 m^{-2} h^{-1}$ for a period of approximately 30 to 120 days. The invention employs a mesophilic bacterial inoculum that is maintained within an optimal operating range of between 25° C. and 45° C. for the duration of the test. After oxidation is completed, ore is rinsed, drained and removed in preparation for subsequent gold extraction tests.

Reactor apparatus 1 is equipped with a plenum chamber 30 of unique design that facilitates support of the charge, aeration of the ore, collection of the effluent for sampling and inoculum build-up and regeneration. Referring to FIG. 2, plenum chamber 30 is equipped with various nozzles and valves to facilitate operation of the column, removal of samples and connection to ancillary equipment (e.g., pumps). The charge is supported on perforated plate 32 covered with a porous fabric through which low-pressure air can flow. This also permits the effluent (spent inoculum) to drain into the effluent reservoir 34 where it can be sampled via effluent sample valve 36. Effluent flows from effluent reservoir 34 over a circular weir orifice 38 into the lower part of the chamber, which serves as an inoculum regeneration reactor 40. Bacterial oxygen requirements are met by introducing air 42 into the reactor through sparge pipe 44. The flow of air 42 through inlet port 41 may be controlled by valve 43. The same air is preferably used to aerate the column or air may be provided by an alternate air source. Regenerated inoculum is then recirculated to the top of the column through valve 45 using pump 16. Pump 16 may be controlled by switch 46, flow indicator controller 47 and flow sensor 48. Plenum chamber 30 has a catholyte return port 50. The lower portion of plenum chamber 30 is preferably covered by cap 52, which may have a drain port 54 controlled by drain valve 56. Plenum chamber 30 may also have a pressure indicator 58, pressure sensor 60 to determine the pressures within the chamber, and a flow indicator controller 62 and flow sensor 64 to monitor air flow.

Pump 14 directs fluid from plenum chamber 30 through catholyte outlet 61 and catholyte outlet valve 63 to electrocell 70. Pump 14 may be controlled by switch 66, flow indictor controller 67 and flow sensor 68.

It has been discovered that inoculum regeneration may be augmented by use of an electrocell 70, which works synergistically in conjunction with plenum chamber inoculum build-up or regeneration reactor 40. The electrocell is of the type commonly used in electrophoretic process applications. The principle of the cell in this application is illustrated in FIG. 3. Referring to FIG. 3, electrocell 70 is of the dual compartment type, the anode compartment 72 and cathode compartment 74 being separated by a semi-permeable membrane 76 that permits passage of hydroxonium ions and oxygen, but not hydrated ferric or sulfate ions. In the preferred embodiment the membrane comprises DuPont Naflon #324. Anode 78 is preferably composed of platinum-coated titanium and the cathode 80 is preferably composed of graphite. Catholyte 82 is a bleed-stream of regenerated inoculum solution from the main plenum chamber and substantially comprises ferric sulfate solution. Pump 84 is used to return fluid which may contain both bacteria and catholyte from electrocell 70 to plenum chamber 30. Anolyte 86 is added to and removed from electrocell 70 via pump 88. Upon removal, the anolyte may be recycled or disposed of as appropriate. The preferred anolyte comprises 0.1M $H_2SO_4$. Ferric iron is reduced to ferrous iron at the cathode 80 and is reoxidized to ferric by bacteria 89 in the solution. Water is split into oxygen and hydroxonium ions at anode 78, which migrate to the catholyte chamber 74 under the influence of the electric field, where they are recombined into water by the bacteria. This cycle continues indefinitely while current flows through the cell as a result of which the bacterial population continues to grow.

Electrocell 70 preferably has a current (amperage) indicator controller 90 and sensor 92 and a voltage indicator controller 94 and voltage sensor 96. Use of the electrocell in combination with the plenum chamber provides stability of the system, thereby overcoming one of the fundamental problems associated with biooxidation. The bacterial population will continue to grow while there is substrate to feed on. The primary bacterial substrate in biooxidation is the ferrous iron associated with the sulfides. The population increases as the substrate is consumed so the system would become increasingly less stable. Ultimately, the population would become so large that it would eventually collapse and biooxidation would cease. The electrocell regenerates ferrous iron by reduction of ferric iron in the effluent and makes it available as a nutrient to the bacteria. In other words, the bacteria see an endless supply of ferrous without there being any net increase in ferrous in the system and therefore continue to grow. Under normal circumstances oxygen production and mass transfer considerations would limit the bacterial generating capacity of the electrocell. However, when used in combination with the plenum reactor the catholyte is saturated with oxygen and therefore the cell is not oxygen mass transfer limited. The cell effectively recycles ferric substrate and oxygen. The cell's capacity to generate bacteria is thus limited only by its ferric reduction capacity, or simply put, its size.

Accordingly, one embodiment of the invention is directed to an apparatus for simulating a biooxidation process comprising an oxidation chamber, a bacterial regenerator coupled to the oxidation chamber, the regenerator comprising means for providing oxygen to a population of bacteria being regenerated and means for providing a ferrous iron substrate to the population of bacteria, means for recirculating the population of bacteria from the bacterial regenerator through the oxidation chamber, and means for aerating the oxidation chamber. As used herein, a "bacterial regenerator" refers to a device for optimizing bacterial activity before recycling of active inoculum to the test charge. The apparatus is preferably used to simulate heap biooxidation of a refractory ore containing one or more precious metals, such as gold.

Preferably, the means for providing oxygen and the means for aerating the oxidation chamber comprise a plenum chamber coupled to the oxidation chamber. The bacterial regenerator preferably comprises a plenum chamber, an electrocell, a first communication path between the plenum chamber and electrocell such that the fluid mixture in the chamber flows from the plenum chamber to the electrocell, and a second communication path between the plenum chamber and electrocell such that the fluid flows in reverse, from the electrocell to the plenum chamber. In a preferred embodiment of the present invention, the means for providing a ferrous iron substrate comprises an electrocell and the oxidation chamber comprises a column. The electrocell regenerates ferrous iron by reduction of ferric iron in the effluent to make ferrous iron available as a nutrient to the population of bacteria. The oxidation chamber is preferably maintained at a temperature of between about 25° C. and about 45° C.

The population of bacteria comprises bacteria suitable for biooxidation, such as chemo-autolithotrophs, and preferably comprises one or more species of bacteria selected from the group consisting of *Thiobacillus ferrooxidans, Thiobacillus thiooxidans, Sulfobacillus thermosulfidooxidans, Metallosphera sedula* or *Leptospirillum ferroxidans*, and mixtures thereof.

Another embodiment of the invention is directed to a biooxidation apparatus for evaluating the suitability of a refractory ore to heap biooxidation. This apparatus comprises an oxidation chamber, a bacterial regenerator coupled to the oxidation chamber, the regenerator comprising means for providing oxygen to a population of bacteria being regenerated and means for providing a ferrous iron substrate to the population of bacteria, means for recirculating the population of bacteria from the bacterial regenerator through the oxidation chamber, means for aerating the oxidation chamber and means for sampling the ore. In a preferred embodiment, the apparatus is small and portable.

Another embodiment of the invention is directed to an apparatus for generating a selected population of bacteria useful for the biooxidation of a specific refractory ore. This apparatus comprises an oxidation chamber containing bacteria, a bacterial regenerator coupled to the oxidation chamber, the regenerator comprising means for providing oxygen to a population of bacteria being regenerated and means for providing a ferrous iron substrate to the population of bacteria, means for recirculating the population of bacteria from the bacterial regenerator through the oxidation chamber and means for aerating the oxidation chamber.

Another embodiment of the invention is directed to a method for generating a selected population of bacteria useful for the biooxidation of a specific refractory ore. This method comprises the steps of crushing the refractory ore, loading the crushed ore into an oxidation chamber, circulating an acid through the chamber to lower the pH of the ore, removing the acid, inoculating the ore with a first population of biooxidative bacteria, aerating the oxidation chamber, selecting for a second population of bacteria that rapidly and efficiently oxidize the ore by allowing the first population of bacteria to biooxidize the ore, collecting the second population of bacteria in a regeneration chamber, regenerating the second population of bacteria, recirculating the regenerated second population of bacteria through the oxidation chamber for a period of time sufficient to oxidize the ore, thereby selecting for a third population of bacteria, and harvesting the third population of bacteria. As will be clear to one of skill in the art, the steps of collecting, regenerating and recirculating can be repeated multiple times as needed to further enhance the selection of a bacteria population particularly suited to biooxidize the specific ore.

The first population of bacteria preferably comprises aerobic, acidophilic, thermophilic chemo-autolithotrophs, such as one or more species of bacteria selected from the group of *Thiobacillus ferrooxidans, Thiobacillus thiooxidans, Sulfobacillus thermosul fidooxidans, Metallosphera sedula* or *Leptospirillum ferroxidans*, or mixtures of these bacterial species.

Preferably the acid is sulfuric acid, and the pH is lowered to between 1.5 and 1.8. The biooxidative bacteria are preferably regenerated with a plenum chamber which provides oxygen, and an electrocell which provides oxygen and a ferrous iron substrate.

Another embodiment of the invention is directed to a method for evaluating the suitability of a refractory ore for biooxidation. This method comprises the steps of crushing the ore, loading the crushed ore into an oxidation chamber, circulating an acid through the chamber to lower the pH of the ore, removing the acid, inoculating the ore with a population of biooxidative bacteria, aerating the oxidation chamber, regenerating the population of bacteria, circulating regenerated bacteria through the ore in the oxidation chamber for a period of time sufficient to oxidize the ore, and evaluating the ore after oxidation. In this embodiment, the acid is sulfuric acid and the population of bacteria is regenerated with a plenum chamber which provides oxygen and an electrocell which provides oxygen and a ferrous iron substrate. The pH is preferably lowered to between 1.5 and 1.8.

Another embodiment is directed to an electrocell for enhancing the growth of biooxidative bacteria comprising: an anode compartment containing an anode; a cathode compartment containing a cathode, the cathode compartment being disposed adjacent the anode compartment; a semipermeable membrane disposed between the anode compartment and the cathode compartment, said semipermeable membrane allowing for passage of hydroxonium ions and oxygen between the anode compartment and the cathode compartment and preventing passage of hydrated ferric ions or sulfate ions between the anode compartment and the cathode compartment; means for adding a concentration of acid, such as $H_2SO_4$, to the cathode compartment; and means for adding ferric sulfate solution and biooxidative bacteria to the anode compartment. The ferric sulfate solution and biooxidative bacteria preferably comprise an effluent inoculum solution from a refractory ore being biooxidized. In this embodiment, ferric iron is reduced to ferrous iron at the cathode and water is split into oxygen and hydroxonium ions at the anode. The concentration of $H_2SO_4$ is preferably 0.1 M.

Still another embodiment of the invention is directed to a method of providing a continuous supply of oxygen and ferrous iron to biooxidative bacteria being used to biooxidize a refractory ore comprising the step of providing an electrocell comprising: an anode compartment containing an anode; a cathode compartment containing a cathode wherein said cathode compartment is disposed adjacent the anode compartment; a semipermeable membrane disposed between the anode compartment and the cathode compartment, the semipermeable membrane allowing for passage of hydroxonium ion and oxygen between the anode compartment and the cathode compartment and preventing passage of hydrated ferric ions or sulfate ions between the cathode compartment and the anode compartment; means for adding a concentration of acid, such as $H_2SO_4$, to the anode compartment; and means for adding an effluent from the biooxidation of the refractory ore to the cathode compartment, the effluent comprising ferric sulfate solution and biooxidative bacteria wherein water is split into oxygen and hydroxonium ions at the anode and ferric iron is reduced to ferrous iron at the cathode.

Still another embodiment is directed to a method of enhancing the growth of biooxidative bacteria during biooxidation of a refractory ore comprising the step of providing a continuous supply of ferrous iron and oxygen to said biooxidative bacteria. The step of providing a continuous supply of ferrous iron and oxygen is preferably accomplished by the use of an electrocell. The electrocell preferably comprises: an anode compartment containing an anode; a cathode compartment containing a cathode, the cathode compartment being disposed adjacent the anode compartment; a semipermeable membrane disposed between the anode compartment and the cathode compartment, the membrane allowing passage of hydroxonium ion and oxygen between the anode compartment and the cathode compartment and preventing passage of hydrated ferric ions or sulfate ions between the cathode compartment and the anode compartment; means for adding a concentration of acid, such as $H_2SO_4$ to the anode compartment; and means for adding an effluent from the biooxidation of the refractory ore to the cathode compartment, the effluent comprising ferric sulfate solution and biooxidative bacteria, wherein water is split into oxygen and hydroxonium ions at the anode and ferric iron is reduced to ferrous iron at the cathode.

Still another embodiment is directed to an apparatus for recycling effluent from the biooxidation of a refractory ore in an oxidation chamber comprising: a bacterial regenerator coupled to the oxidation chamber, the regenerator comprising means for providing oxygen to a population of bacteria being regenerated and means for providing a ferrous iron substrate to the population of bacteria; and means for recirculating the population of bacteria from the bacterial regenerator through the oxidation chamber. The means for providing oxygen and the means for aerating the oxidation chamber preferably comprises a plenum chamber coupled to the oxidation chamber.

In this embodiment, the bacterial regenerator preferably comprises a plenum chamber, an electrocell, a first communication path between the plenum chamber and electrocell such that fluid can flow from the plenum chamber to the electrocell and a second communication path between the plenum chamber and electrocell such that fluid can flow from the electrocell to the plenum chamber.

Still another embodiment is directed to a method for recycling effluent from the biooxidation of a refractory ore in an oxidation chamber comprising: regenerating bacteria by providing oxygen and a ferrous iron substrate to a population of bacteria; and recirculating the regenerated population of bacteria through the oxidation chamber.

Other embodiments and uses of the invention will be apparent to those skilled in the art from consideration of the specification and practice of the invention disclosed herein. All documents referenced herein, including all U.S. patents, are specifically and entirely incorporated by reference. As is understood by those of ordinary skill in the art, variations and modifications of each of the disclosed embodiments can be made within the scope of this invention. The specification and examples should be considered exemplary only with the true scope and spirit of the invention indicated by the following claims.

I claim:

1. An apparatus for simulating a biooxidation process comprising:
   an oxidation chamber for performing heap bioxidation on ore said ore containing one or more precious metals;
   a bacterial regenerator coupled to the oxidation chamber comprising:
      means for providing oxygen to a population of bacteria;
      means for regenerating and providing a ferrous iron substrate to the population of bacteria;
      means for recirculating the population of bacteria from the bacterial regenerator through the oxidation chamber; and
   means for aerating the oxidation chamber.

2. The apparatus of claim 1 wherein the precious metal is gold.

3. The apparatus of claim 1 wherein the bacterial regenerator comprises a plenum chamber, an electrocell, a first communication path between the plenum chamber and said electrocell such that fluid can flow from the plenum chamber to the electrocell, and a second communication path between said plenum chamber and said electrocell such that fluid can flow from the electrocell to the plenum chamber.

4. The apparatus of claim 1 wherein the means for regenerating and providing a ferrous iron substrate comprises an electrocell.

5. The apparatus of claim 4 wherein the electrocell regenerates ferrous iron by reduction of ferric iron in the effluent to make ferrous iron available as a nutrient to the population of bacteria.

6. The apparatus of claim 1 in combination with a population of bacteria contained therein, said population of bacteria comprising chemoautolithotrophs.

7. The apparatus of claim 1 in combination with a population of bacteria, wherein the population of bacteria comprises one or more species of bacteria selected from the group consisting of *Thiobacillus ferrooxidans, Thiobacillus thiooxidans, Sulfobacillus thermosulfidooxidans, Mettalosphera sedula* and *Leptospirillium ferroxidans*, and mixtures thereof.

8. A biooxidation apparatus for evaluating the suitability of a refractory ore to heap biooxidation comprising:
   an oxidation chamber for performing heap biooxidation on an ore the ore containing one or more precious metals;
   a bacterial regenerator coupled to the oxidation chamber, the regenerator comprising means for providing oxygen to a population of bacteria being regenerated and means for regenerating and providing a ferrous iron substrate to the population of bacteria;
   means for recirculating the population of bacteria from the bacterial regenerator through the oxidation chamber;
   means for aerating the oxidation chamber; and
   means for sampling the refractory ore.

9. The apparatus of claim wherein 8 the precious metal is gold.

10. The apparatus of claim 8 wherein the bacterial regenerator comprises a plenum chamber, an electrocell, a first communication path between the plenum chamber and said electrocell such that fluid can flow from the plenum chamber to the electrocell, and a second communication path between said plenum chamber and said electrocell such that fluid can flow from the electrocell to the plenum chamber.

11. The apparatus of claim 8 wherein the means for regenerating and providing a ferrous iron substrate comprises an electrocell.

12. The apparatus of claim 11 wherein the electrocell regenerates ferrous iron by reduction of ferric iron in the effluent to make ferrous iron available as a nutrient to the population of bacteria.

13. The apparatus of claim 8 in combination with a population of bacteria contained therein, said population of bacteria comprising chemoautolithotrophs.

14. The apparatus of claim 8 in combination with a population of bacteria, wherein the population of bacteria comprises one or more species of bacteria selected from the group consisting of *Thiobaccillus ferroxidans, Thiobaccillus thiooxidans, Sulfobaccillus thermosulfidooxidans, Metallosphera sedula* and *Leptospirillum ferroxidans*, and mixtures thereof.

15. An apparatus for generating a population of bacteria useful for the biooxidation of a specific refractory ore comprising: an oxidation chamber containing bacteria and ore, said ore containing one or more precious metals; a bacterial regenerator coupled to the oxidation chamber wherein the regenerator comprises: means for providing oxygen to the bacteria being regenerated; and means for regenerating and providing a ferrous iron substrate to said bacteria; means for recirculating the bacteria from the bacteria regenerator through the oxidation chamber; and means for aerating the oxidation chamber.

16. The apparatus of claim 15 wherein the bacterial regenerator comprises a plenum chamber, an electrocell, a first communication path between the plenum chamber and said electrocell such that fluid can flow from the plenum chamber to the electrocell, and a second communication path between said plenum chamber and said electrocell such that fluid can flow from the electrocell to the plenum chamber.

17. The apparatus of claim 15 wherein the means for regenerating and providing a ferrous iron substrate comprises an electrocell.

18. The apparatus of claim 17 wherein the electrocell regenerates ferrous iron by reduction of ferric iron in the effluent to make ferrous iron available as nutrient to the population of bacteria.

19. The apparatus of claim 15 in combination with a population of bacteria comprises chemoautolithotrophs.

20. The apparatus of claim 15 in combination with a population of bacteria, wherein the population of bacteria comprises one or more species of bacteria selected from the group consisting of *Thiobaccillus ferroxidans, Thiobacillus thiooxidans, Sulfobaccillus thermosulfidooxidans, Mettalosphera sedula* and *Leptospirillium ferroxidans*, and mixtures thereof.

21. An apparatus for recycling effluent from the biooxidation of a refractory ore in an oxidation chamber comprising:
   a bacterial regenerator coupled to the oxidation chamber, the regenerator comprising a plenum chamber, an electrocell, a first communication path between the plenum chamber and the electrocell such that a fluid can flow from the plenum chamber to the electrocell and a second communication path between the plenum chamber and the electrocell such that fluid can flow from the electrocell to the plenum chamber and means for providing oxygen to a population of bacteria being regenerated and means for providing a ferrous iron substrate to the population of bacteria; and
   means for recirculating the population of bacteria from the bacterial regenerator through the oxidation chamber.

22. The apparatus of claim 21 in combination with a population of bacteria, wherein the population of bacteria comprises one or more species of bacteria selected from the group consisting of *Thiobaccillus ferroxidans, Thiobaccillus thiooxidans, Sulfobacillus thermosulfidooxidans, Mettalosphera sedula* and *Leptospirillium ferroxidans*, and mixtures thereof.

23. The apparatus of claim 21 in combination with a refractory ore placed therein, said refractory ore containing one or more precious metals.

* * * * *